(12) United States Patent
Murakawa

(10) Patent No.: US 8,659,780 B2
(45) Date of Patent: Feb. 25, 2014

(54) PRINT MANAGEMENT FOR PLURALITY OF PRINT REQUESTS IN IMAGE FORMING APPARATUS

(75) Inventor: Tsuyoshi Murakawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 44 days.

(21) Appl. No.: 13/431,555

(22) Filed: Mar. 27, 2012

(65) Prior Publication Data

US 2012/0250092 A1    Oct. 4, 2012

(30) Foreign Application Priority Data

Mar. 30, 2011  (JP) ................................. 2011-073924

(51) Int. Cl.
*G06F 3/12* (2006.01)
(52) U.S. Cl.
USPC ....................................................... 358/1.15
(58) Field of Classification Search
USPC ....................................................... 358/1.15
See application file for complete search history.

(56) References Cited

U.S. PATENT DOCUMENTS

| | | | |
|---|---|---|---|
| 5,774,356 A | 6/1998 | Hisatake et al. | |
| 6,474,881 B1 | 11/2002 | Wanda | |
| 2002/0118387 A1 | 8/2002 | Patton | |
| 2003/0007819 A1 | 1/2003 | Wanda | |
| 2003/0035132 A1* | 2/2003 | Tomita et al. | 358/1.14 |
| 2008/0049249 A1 | 2/2008 | Tomita | |

FOREIGN PATENT DOCUMENTS

| | | |
|---|---|---|
| EP | 1408401 A2 | 4/2004 |
| JP | 61-196326 A | 8/1986 |
| JP | 2001-75768 A | 3/2001 |
| JP | 2003-271334 A | 9/2003 |
| JP | 2007-1044 A | 1/2007 |
| JP | 2008-052344 A | 3/2008 |
| JP | 2008-102603 A | 5/2008 |
| JP | 2009-269259 A | 11/2009 |

OTHER PUBLICATIONS

English Machine Translation of JP 2001-075768.
English Machine Translation of JP 2008-102603.
English machine translation for JP 2003-271334.
English Abstract for JPS61-196326.
English machine translation for JP 2007-1044.
English Abstract for JP2008-052344.
Extended European Search Report issued to EP Application No. 12161667.6, mailed Aug. 7, 2013.

* cited by examiner

*Primary Examiner* — Eric A Rust

(57) ABSTRACT

An image forming apparatus according to the present disclosure includes a buffering unit, an information storage unit, a print processing unit, and a print management unit. The buffering unit receives print requests transmitted from the information processing apparatuses. The information storage unit stores information about documents that are requested to be printed in response to the print requests in an order in that the print requests are received by the buffering unit. The print processing unit performs a printing process. The print management unit, based on the print requests, designates the documents in an order in which the information about the documents is stored in the information storage unit, and directs the print processing unit to print the designated documents.

9 Claims, 10 Drawing Sheets

MANAGEMENT INFORMATION TABLE

| MANAGEMENT TYPE | INFORMATION TYPE | STATE |
|---|---|---|
| USER ID | usd12345 | --- |
| RECEPTION NUMBER | print0002 | --- |
| Document Num | 5 | --- |
| Document[0] | Doc0001 | BEING PRINTED |
| Document[1] | Doc0003 | BEING PRINTED |
| Document[2] | Doc0008 | BEING REQUESTED |
| Document[3] | Doc0009 | STANDBY |
| Document[4] | Doc1002 | STANDBY |

FIG. 2

MANAGEMENT INFORMATION TABLE

| MANAGEMENT TYPE | INFORMATION TYPE | STATE |
|---|---|---|
| USER ID | usd12345 | — |
| RECEPTION NUMBER | print0002 | — |
| Document Num | 5 | — |
| Document [0] | Doc0001 | BEING PRINTED |
| Document [1] | Doc0003 | BEING PRINTED |
| Document [2] | Doc0008 | BEING REQUESTED |
| Document [3] | Doc0009 | STANDBY |
| Document [4] | Doc1002 | STANDBY |

PRINT MANAGEMENT FOR PLURALITY OF PRINT REQUESTS IN IMAGE FORMING APPARATUS

REFERENCE TO RELATED APPLICATIONS

This application is based upon and claims the benefit of priority from the corresponding Japanese Patent Application No. 2011-073924, filed in the Japan Patent Office on Mar. 30, 2011, the entire contents of which are incorporated herein by reference.

BACKGROUND

The present disclosure relates to an image forming apparatus that performs a printing process based on a print request transmitted from an information processing apparatus.

In recent years, in companies and government ministries, a plurality of personal computers (PCs) and a common printer are connected to each other by a wired local area network (LAN) or a wireless LAN to construct a network environment.

In the network environment, the plurality of PCs individually transmits print requests to the printer. Whenever the print request is received, the printer performs a printing process based on the received print request.

When receiving the print request in the state in which no printing process is performed, the printer instantaneously starts the printing process for the received print request.

However, when the print request is received from another PC during a printing process (when the print request is received), it is difficult for the printer to instantaneously start the printing process for the received print request. Therefore, in this case, the problem is how to respond to the print request.

As a method for solving the problem, the following technique has been proposed.

For example, when a print request is transmitted from a PC, job information about the print request is registered in a request order list. At that time, no print data is received. Then, the job information to be printed is selected from the job information items registered in the request order list in the order in which the job information is registered and the PC that has transmitted the selected job information is allowed to transmit print data (for example, see Related Art 1: Japanese Unexamined Patent Application Publication 2009-269259).

According to the technique disclosed in Related Art 1, the order in which the print requests are received is managed by the request order list. Therefore, when the job information is selected in the order in which it is registered in the request order list, the image forming apparatus can perform the printing process in the order in which the print requests are received.

However, the technique disclosed in Related Art 1 has the following problems.

For example, in Related Art 1, the printer (image forming apparatus) does not receive a new print request that has been transmitted (received) during the printing process and does not spool print data. Therefore, while the printer performs the printing process, the PC that has transmitted the print request cannot close the application until the printer ends the printing process. After the printing process ends, the PC transmits print data and is maintained in a standby state until the spooling of the print data is completed. Therefore, the user who uses the PC to output the print request to the printer needs to wait in front of the PC.

This state will be described with reference to FIG. 8.

As illustrated in FIG. 8, for example, one information processing apparatus 201 transmits print request X to image forming apparatus 100 (Step S100).

When image forming apparatus 100 receives print request X, first buffering unit 101 registers job information about print request X in the request order list.

Then, first buffering unit 101 selects the first registered job information item from the job information items registered in the request order list. Assuming that the job information about print request X is registered first, first buffering unit 101 permits the transmission of print data to the information processing apparatus 201 that has transmitted print request X (Step S101).

When getting the permission to transmit print data, information processing apparatus 201 transmits the print data to image forming apparatus 100 (Step S102).

When image forming apparatus 100 receives the print data, first buffering unit 101 stores the print data in a buffer (buffering process; Step S103). When the storage of the print data is completed, first buffering unit 101 requests print processing unit 103 to perform a printing process (Step S104). Print processing unit 103 performs printing process X based on the print data stored in the buffer (Step S105).

Then, it is assumed that another information processing apparatus 202 transmits print request Y to image forming apparatus 100 (Step S106).

When image forming apparatus 100 receives print request Y, second buffering unit 102 registers job information about print request Y in the request order list.

Assuming that image forming apparatus 100 receives print request Y before the printing process X ends, the job information about print request Y is registered after the job information about print request X in the request order list (the job information about print request Y is the second job information). Therefore, at that time, second buffering unit 102 does not transmit a signal indicating the permission of the transmission of print data. In this way, information processing apparatus 202 is in a standby state (waiting process; Step S107).

Then, when printing process X ends, second buffering unit 102 permits information processing apparatus 202 to transmit the print data for print request Y (Step S108).

When getting the permission to transmit the print data, information processing apparatus 202 transmits the print data to image forming apparatus 100 (Step S109).

When image forming apparatus 100 receives the print data, second buffering unit 102 stores the print data in the buffer (buffering process; Step S110). When the storage of the print data is completed, the second buffering unit 102 requests print processing unit 103 to perform a printing process (Step S111). Print processing unit 103 performs a printing process Y based on the print data stored in the buffer (Step S112).

As such, when print request Y is transmitted from information processing apparatus 202 before the printing process X ends, image forming apparatus 100 does not receive print request Y. Therefore, the user of the information processing apparatus 202 needs to wait until the printing process X ends.

The following method is considered in order to solve the problems.

For example, when the image forming apparatus 100 receives a print request, buffering units 101 and 102 receive the print request and spool the print data, regardless of whether print processing unit 103 performs a printing process.

Specifically, for example, as illustrated in FIG. 9, when print request Y is transmitted from information processing apparatus 202 (Step S200) or second buffering unit 102 of image forming apparatus 100 receives print request Y, regardless of whether print processing unit 103 performs a printing process, and transmits a signal for performing the transmission of print data to information processing apparatus 202 (Step S201).

When receiving the signal indicating the permission of the transmission of print data, information processing apparatus 202 transmits print data related to print request Y to image forming apparatus 100 (Step S202).

When receiving the print data, second buffering unit 102 of image forming apparatus 100 spools the print data in the buffer (buffering process; Step S203).

When printing process X related to print request X transmitted from information processing apparatus 201 ends (Step S105), second buffering unit 102 requests print processing unit 103 to perform a printing process (Step S204). When receiving the print request, print processing unit 103 performs printing process Y based on the print data stored in the buffer (Step S205).

As such, image forming apparatus 100 spools the print data for each print request. Therefore, it is possible to receive the print request and spool print data in the buffer, regardless of whether a printing process is being performed. In this way, the image forming apparatus 100 can perform the printing process in the order in which the print requests are received. In addition, the user of information processing apparatus 202 does not need to wait until printing process X that is currently being performed ends.

However, this method has the following new problems.

For example, in image forming apparatus 100, after the buffering of print data by buffering units 101 or 102 is completed, print processing unit 103 starts a printing process.

However, when a print request for a plurality of documents is received, the printing process is sequentially performed from the buffered documents.

Therefore, when print requests for a plurality of documents are transmitted from plurality of information processing apparatuses 200 substantially at the same time, the printing process may be to be interrupted.

An example of the interruption will be described with reference to FIG. 10.

For example, when receiving a print request transmitted from information processing apparatus 201, first buffering unit 101 of image forming apparatus 100 buffers print data (Step S300).

It is assumed that the print request transmitted from information processing apparatus 201 is for printing three documents.

First buffering unit 101 spools the print data of the first document in the buffer. When the buffering of the print data is completed, first buffering unit 101 transmits a request to print document to the print processing unit 103 (step s301).

Print processing unit 103 performs a printing process X1 based on the print data of the first document (Step S302).

When the printing process X1 ends, first buffering unit 101 transmits a request to print the second document to print processing unit 103 after the spooling of the print data of the second document is completed (Step S303). Print processing unit 103 performs the printing process X2 based on print data of the document (Step S304).

When print request Y is transmitted from information processing apparatus 202 to image forming apparatus 100 during the printing process X2, second buffering unit 102 buffers print data related to print request Y (Step S305).

It is assumed that print request Y transmitted from information processing apparatus 202 is for printing one document.

When the buffering of the print data is completed, second buffering unit 102 transmits a request to print the document to print processing unit 103 (Step S306).

Print processing unit 103 performs the printing process Y based on the print data of the document (Step S307).

When the spooling of the print data of the third document is completed, first buffering unit 101 transmits a request to print the document (Step S308). Print processing unit 103 performs a printing process X3 based on the print data of the document (Step S309).

As such, when one print request to print a plurality of documents is received and a print request is transmitted from another information processing apparatus 200 during the printing process based on the print request, the printing process may be to be interrupted.

As a result, in some cases, the printout of the document corresponding to print request Y is mixed with the printout of the second document corresponding to print request X and the printout of the third document corresponding to print request X in the output tray of image forming apparatus 100. That is, when the process illustrated in FIG. 10 is performed, the printout corresponding to print request X and the printout corresponding to print request Y are likely to be mixed with each other.

When the user of information processing apparatus 201 moves to image forming apparatus 100 in order to pick up the printout, checks only the first and last pages of the printout, and picks up the printout while thinking that the printout is the user's own, the user also picks up the printout of another user.

When the user of information processing apparatus 201 finds that the printout of another user is mixed with the user's own printout, the user needs to manually sort the printouts, which is very troublesome.

SUMMARY

An image forming apparatus according to an embodiment of the present disclosure is connected to a plurality of information processing apparatuses so as to communicate therewith.

The image forming apparatus includes a buffering unit, an information storage unit, a print processing unit, and a print management unit.

The buffering unit is configured to receive print requests transmitted from the information processing apparatuses.

The information storage unit is configured to store information about documents that are requested to be printed in response to the print requests in an order in which the print requests are received by the buffering unit.

The print processing unit is configured to perform a printing process.

The print management unit, based on the print requests, is configured to designate the documents in an order in which the information about the documents is stored in the information storage unit, and to direct the print processing unit to print the designated documents.

According to another embodiment of the present disclosure, there is provided a method of forming an image in an image forming apparatus that is connected to a plurality of information processing apparatuses so as to communicate therewith.

The method includes: (i) receiving, via a buffering unit, print requests transmitted from the information processing apparatuses; (ii) storing, via an information storage unit, information about documents that are requested to be printed in response to the print requests in an order in which the print requests are received by the buffering unit; (iii) performing, via a print processing unit, a printing process; (iv) based on the print requests, designating, via the print management unit, the documents in an order in which the information about the documents is stored in the information storage unit and directing, via the print management unit, the print processing unit to print the designated documents.

According to still another embodiment of the present disclosure, there is provided a non-transitory computer-readable recording medium that stores an image forming program executed by a computer of an image forming apparatus. The image forming program includes first to fourth program codes. The first program code allows the computer to receive print requests transmitted from the information processing apparatuses. The second program code allows the computer to store, in a storage unit, information about documents that are requested to be printed in response to the print requests in an order in which the print requests are received by the first program code. The third program code allows the computer to perform a printing process. The fourth program code allows the computer, based on the print requests, to designate the documents in an order in which the information about the documents is stored in the storage unit and to print the designated documents using the third program code.

Additional features and advantages are described herein, and will be apparent from the following Detailed Description and the figures.

BRIEF DESCRIPTION OF THE DRAWINGS

Accompanying drawings:

FIG. 2 shows the structure of a management information table.

DETAILED DESCRIPTION

Hereinafter, exemplary embodiments of the present disclosure will be described with reference to the accompanying drawings.

First Embodiment

Figure 1:
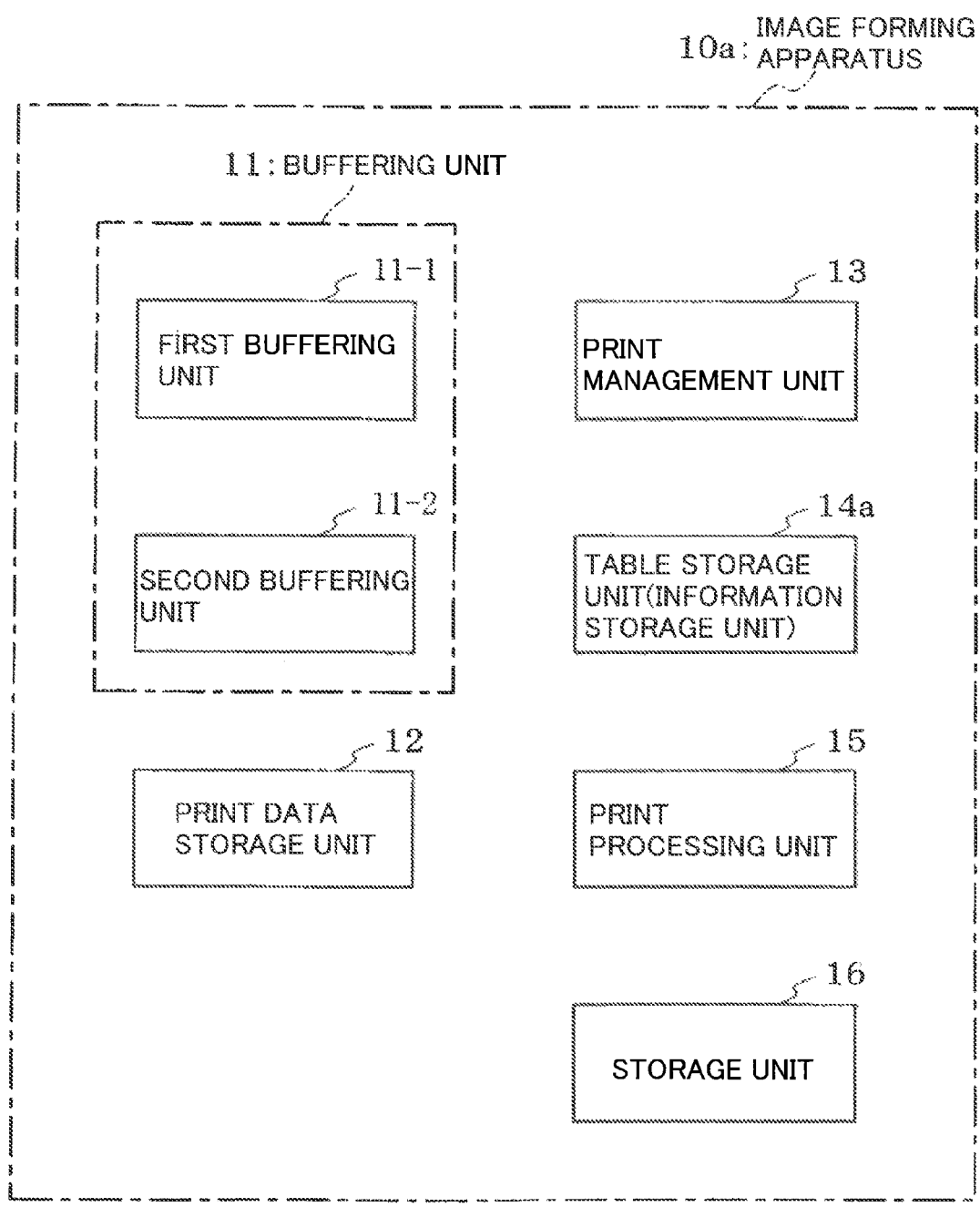
FIG. 1 shows the structure of an image forming apparatus according to a first embodiment of the present disclosure.

First, an image forming apparatus according to a first embodiment of the present disclosure will be described with reference to FIG. 1. FIG. 1 is a block diagram illustrating the structure of the image forming apparatus according to the first embodiment.

(1) Structure of Image Forming Apparatus

The image forming apparatus is a computer that is operated by program control and has a printing function.

Examples of the image forming apparatus include a printer (MFP (Multifunction Peripheral)), a copy machine, a facsimile, and a digital multi-function machine.

The printer includes various kinds of printers, such as an ink-jet printer, a sublimation thermal transfer printer, a dot impact printer, a laser printer, a fusion thermal transfer printer, and like.

As illustrated in FIG. 1, image forming apparatus 10a includes buffering unit 11, print data storage unit 12, print management unit 13, table storage unit 14a, print processing unit 15, and storage unit 16.

Buffering unit 11 includes first buffering unit 11-1 and second buffering unit 11-2.

First buffering unit 11-1 receives a print request transmitted from information processing apparatus 20 (in the first embodiment, first information processing apparatus 20-1) and spools (stores) print data transmitted from information processing apparatus 20 in print data storage unit 12. In addition, first buffering unit 11-1 transmits information about a document transmitted from information processing apparatus 20 to print management unit 13.

Second buffering unit 11-2 receives a print request transmitted from information processing apparatus 20 (in the first embodiment, second information processing apparatus 20-2) and spools print data transmitted from information processing apparatus 20 in print data storage unit 12. In addition, second buffering unit 11-2 transmits information about a document transmitted from information processing apparatus 20 to print management unit 13.

In the first embodiment, the buffering unit (first buffering unit 11-1) that receives the print request transmitted from first information processing apparatus 20-1 is provided separately from the buffering unit (second buffering unit 11-2) that receives the print request transmitted from second information processing apparatus 20-2. However, the present disclosure is not limited thereto. Image forming apparatus 10a may include only one buffering unit. In this case, the buffering unit receives all of the print requests transmitted from at least one of information processing apparatuses 20 and spools print data transmitted from information processing apparatuses 20 in print data storage unit 12.

Print data storage unit 12 is a buffer that stores the print data. Print data storage unit 12 can ensure a storage area with relatively high capacity and spool a plurality of print data items for each print request. The spooling is temporarily storing print data such that the print data can be processed at a high speed.

Print management unit 13 creates a management information table based on the information about the document transmitted from first buffering unit 11-1 or second buffering unit 11-2 and stores the management information table in table storage unit 14a, thereby registering the management information table.

In addition, print management unit 13 designates a print request and a document to be printed according to the content of the management information table, with reference to the management information table.

Then, print management unit 13 extracts print data for the designated print request or document from print data storage unit 12 and transmits the print data and the print request to print processing unit 15.

Print management unit 13 designates a document based on information (for example, "print0002" that will be described below) indicating a storage order included in the management information table and directs the print processing unit to print the designated document. The detailed operation of print management unit 13 will be described in detail in the following "(2) Print management method".

Table storage unit 14*a* stores the management information table.

The management information table is created based on the information about the document transmitted from information processing apparatus 20. Specifically, as illustrated in FIG. 2, the management information table includes, for example, items "management type", "information type", and "state".

The item "management type" is an information item managed as the "information type". Specifically, for example, the "management type" includes an item "user ID" for identifying information processing apparatus 20 transmitting a print request, an item "reception number" indicating the reception number of the print request, an item "Document Num (the number of documents)" indicating the number of documents, and an item "Document[n]" indicating the specification number of each document ([n] is a serial number indicating the number of each document).

The "information type" is detailed information about each of the items included in the "management type". Specifically, in the management information table illustrated in FIG. 2, examples of the "information type" include "usd12345" as information indicating the item "user ID", "print0002" as information indicating the item "reception number", "5" as information indicating the item "Document Num", "Doc0001" as information indicating the item "Document[0]", and "Doc0003" as information indicating the item "Document[1]".

In the "information type", for example, "Doc0001", "Doc0003", and "Doc0008" correspond to the information about the documents.

The "information type" of the item "reception number" may indicate the reception number of the print request, and may be represented by any method. For example, as illustrated in FIG. 2, the "information type" of the "reception number" may be represented by "print0001", "print0002", or "print0003", or a serial number, such as "1", "2", or "3".

The item "state" is information indicating the execution state of a printing process for each document. Specifically, the information of the "state" includes, for example, "being printed", "being requested", "standby", and "print end". Among them, the "being printed" indicates a state in which the document is currently being printed. The "being requested" indicates a state in which a print request has been transmitted from print management unit 13 to print processing unit 15, but the printing of the document has not been started. The "standby" indicates a state in which a request to print the document is not transmitted from print management unit 13 to print processing unit 15. The "print end" indicates that the printing of the document has ended.

Table storage unit 14*a* stores information about the document that is requested to be printed in response to the print request. Table storage unit 14*a* functions as an "information storage unit".

In the first embodiment, table storage unit 14*a* stores information about the documents that are requested to be printed in response to each print request in the order in which the print requests are transmitted. Table storage unit 14*a* stores information about the documents that are requested to be printed in response to each print request in the order in which the print requests are received by the buffering unit.

When a print request is transmitted from print management unit 13, print processing unit 15 performs a printing process based on the print data transmitted from print management unit 13 (or the print data extracted from print data storage unit 12).

In addition, print processing unit 15 includes, for example, a controller for converting the print data transmitted from information processing apparatus 20 into image data (for example, bitmap data), an engine, and a printing unit that prints images on a sheet using various printing methods (for example, a thermal transfer method, a thermal method, a discharge breakdown method, a light exposure pressure fixing method, an ink-jet method, a dot impact method, and a dry electrophotographic method). However, some or all of first buffering unit 11-1, second buffering unit 11-2, print data storage unit 12, print management unit 13, and table storage unit 14*a* may be included in the controller or the engine.

Storage unit 16 includes, for example, a read only memory (ROM), a random access memory (RAM), and a hard disk drive (HDD). Storage unit 16 stores various kinds of data and a program (for example, an image forming program) for implementing various functions of image forming apparatus 10*a*.

The image forming apparatus 10*a* may include, for example, a communication unit and an external communication interface that receive the print request and print data transmitted from the information processing apparatus 20, and an operation panel that displays the content of the set items and functions and is operated by the user such that the user can select the set items or functions, in addition to the structure illustrated in FIG. 1.

Figure 3:
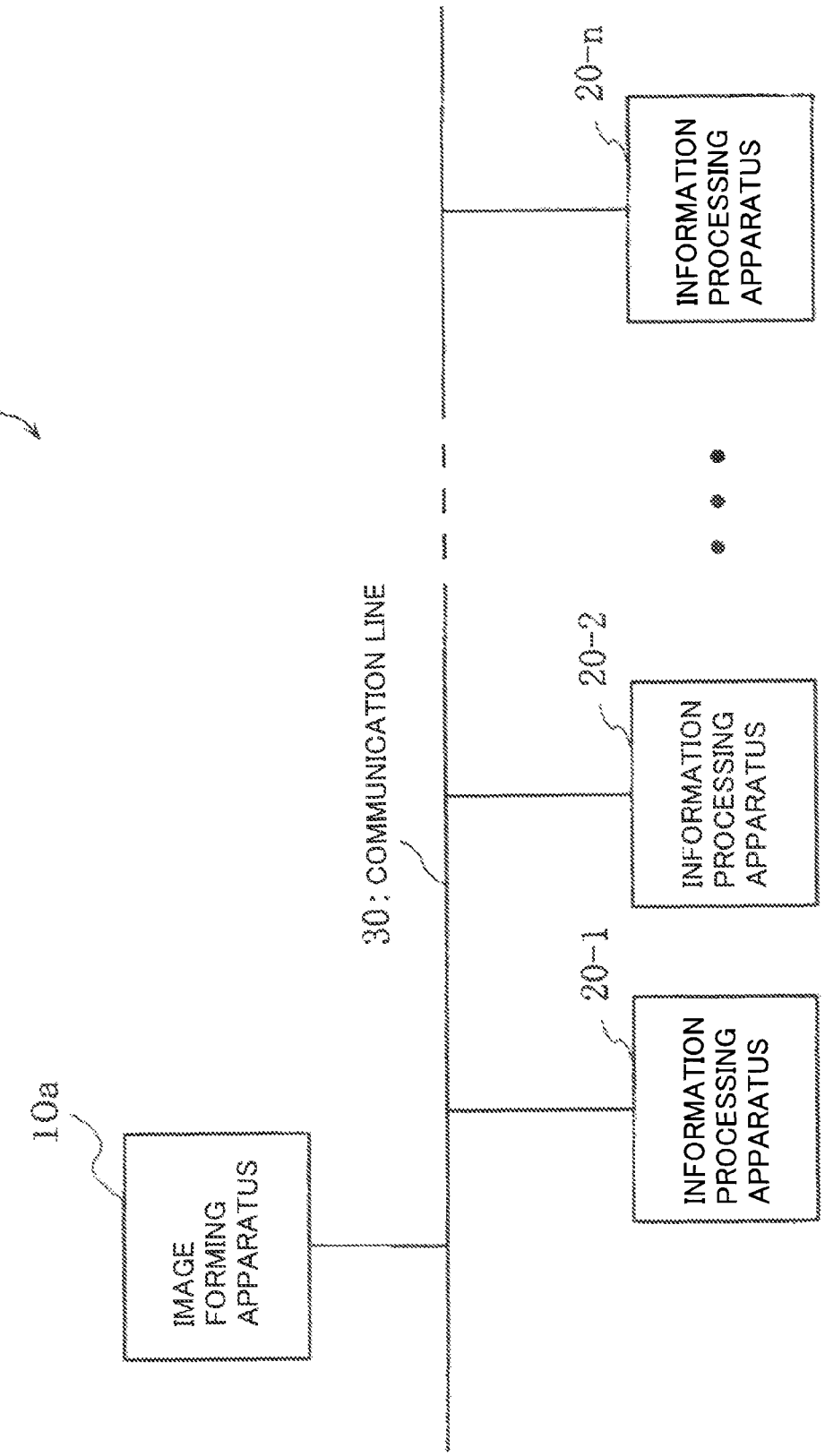
FIG. 3 shows the structure of an information processing system.

As illustrated in FIG. 3, image forming apparatus 10*a* having the above-mentioned structure is connected to at least one of information processing apparatuses 20 (20-1 to 20-n) through communication line 30.

Information processing apparatus 20 is a computer that is operated by program control and can create a document by application software.

When the user inputs or selects a print start command, information processing apparatus 20 transmits a print request to image forming apparatus 10*a*. Information processing apparatus 20 includes, for example, a personal computer (PC).

The print request includes a signal for requesting a printing process, print data, and information about at least one of documents.

The term "document" includes documents or papers. Specifically, examples of the document include documents created by office software, such as word-processing software or spreadsheet software, and PDF files. In addition, examples of the document include text and PDF data read from a paper document by a document scanner.

The print request is configured to designate a plurality of documents and request image forming apparatus 10*a* to print the documents. When a document is stored in a file format, the print request is configured to designate a plurality of files and request image forming apparatus 10*a* to print the files.

In the first embodiment, first buffering unit 11-1 and second buffering unit 11-2 of image forming apparatus 10*a* receive all of the print requests from information processing apparatuses 20. Therefore, the print request is configured to include print data and information about the documents, but the present disclosure is not limited thereto. For example, the print request may include only a print request signal. In this case, the operation of information processing apparatus 20 and image forming apparatus 10*a* may be set as follows. For example, information processing apparatus 20 transmits a printing process signal as the print request to image forming apparatus 10*a*. When receiving the print request, image forming apparatus 10*a* transmits a signal indicating the reception of the print request as a reception signal to information processing apparatus 20. When receiving the reception signal, information processing apparatus 20 transmits print data and information about a document to image forming apparatus 10*a*.

Communication line 30 is for wired or wireless connection between image forming apparatus 10*a* and information processing apparatus 20. Communication line 30 may be, for example, a wired LAN, a wireless LAN, or a wide area network (WAN).

In the first embodiment, a structure including image forming apparatus 10*a*, information processing apparatus 20, and communication line 30 is referred to as an "information processing system 1".

(2) Print Management Method

Next, a print management method that is the operation of the image forming apparatus according to the first embodiment will be described with reference to FIGS. 4 and 5.

Figure 4:
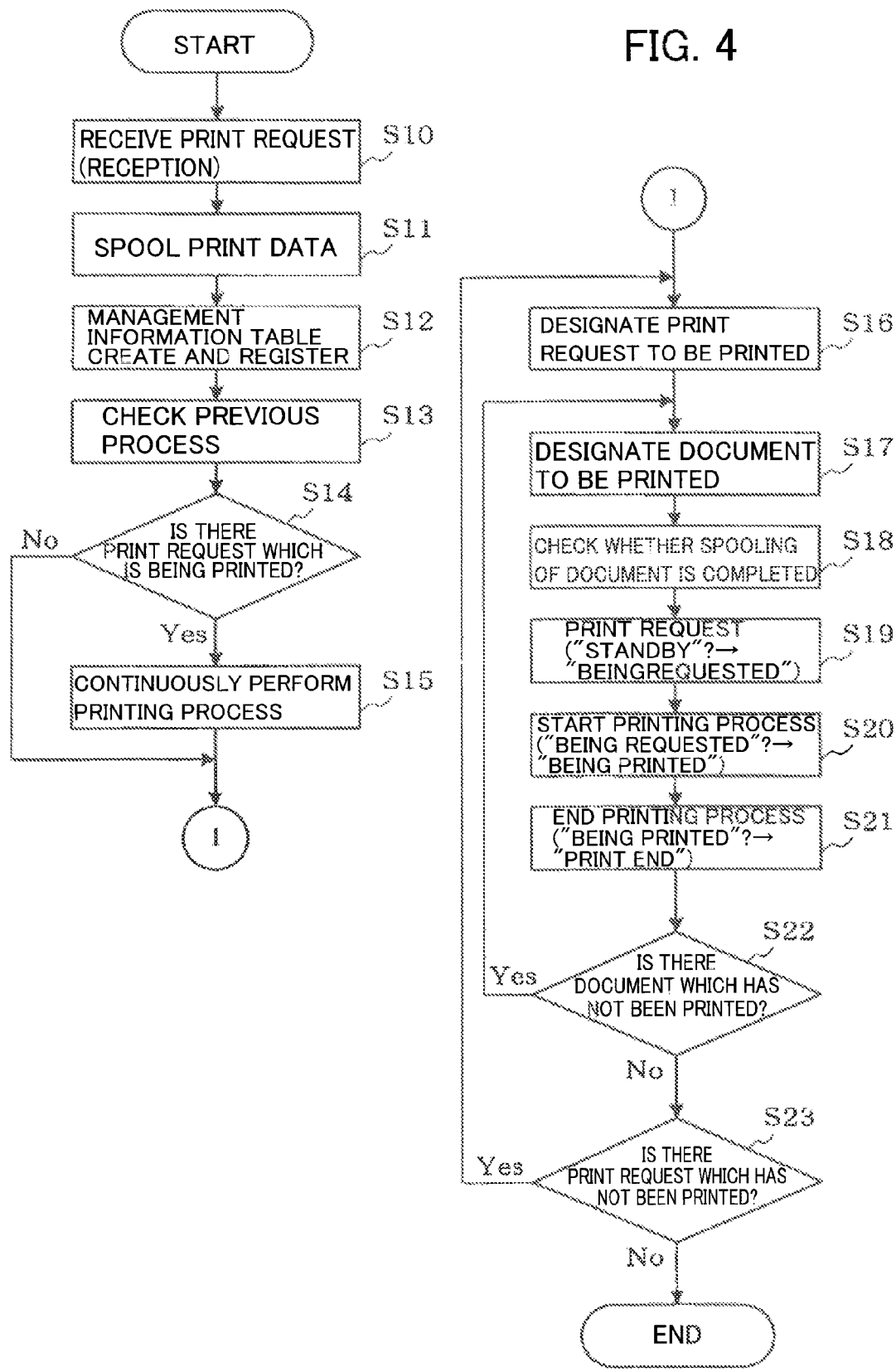
FIG. 4 shows the operation of the image forming apparatus according to the first embodiment of the present disclosure.

FIG. 4 is a flowchart illustrating the procedure of the print management method. FIG. 5 is an operation sequence diagram illustrating the operation of the image forming apparatus when print requests are transmitted from two information processing apparatuses.

In this embodiment, the procedure of the print management method will be described in "(2-1) Procedure of print management method". The example of the print management method will be described in "(2-2) Example".

(2-1) Procedure of Print Management Method

The procedure of the print management method will be described with reference to FIG. 4.

Information processing apparatus 20 transmits a print request to image forming apparatus 10*a*.

Image forming apparatus 10*a* receives the print request through a communication unit (not illustrated). Then, first buffering unit 11-1 receives the print request (Step S10). Information about a document among the data items included in the received print request is transmitted to print management unit 13. Then, print data among the data items included in the print request is spooled in print data storage unit 12 (Step S11).

Print management unit 13 creates a management information table based on the received information about the document (Step S12).

At that time, print management unit 13 sets the "state" of all of the documents in the management information table to the "standby" state.

In addition, print management unit 13 determines the "reception number" of the management information table as follows. Print management unit 13 extracts the latest management information table among the management information tables registered in table storage unit 14*a*, specifies the number of "reception numbers" indicated in the management information table, and sets a number obtained by adding "1" to the specified number as the "reception number" of the management information table to be created. In addition, the print management unit 13 may independently manage the "reception number" and add "1" to the "reception number" whenever the management information table is created. Print management unit 13 stores the created management information table in table storage unit 14*a*, thereby registering the management information table.

In addition, print management unit 13 performs a previous process check operation (Step S13). The previous process check is checking whether there is a print request that is currently being printed by print processing unit 15. In the previous process check operation, print management unit 13 determines whether there is a management information table including information indicating the state "being printed" or "being request" among the management information tables registered in table storage unit 14*a*.

As a result of the previous process check, when there is a print request that is currently being printed (when print management unit 13 confirms that there is a print request that is currently being printed) (Yes in Step S14), print processing unit 15 continuously performs the printing process (Step S15). In this case, at that time, print processing unit 15 does not perform the printing process on the print data corresponding to the management information table that is currently registered in table storage unit 14*a*.

On the other hand, when there is no print request that is currently being printed or when the printing process performed by print processing unit 15 ends, print management unit 13 designates the next print request to be printed (Step S16).

Print management unit 13 extracts the management information tables including information about the document that is in the "standby" state among the management information tables registered in table storage unit 14*a*. Print management unit 13 designates the management information table in which the "reception number" is the smallest among the extracted management information tables, thereby designating the next print request to be printed. When the printing of all of the documents indicated by the document information in the management information table ends, print management unit 13 directs the print processing unit to print the document indicated by document information in the next print request table stored in table storage unit 14*a* (information storage unit).

When the next print request to be printed is designated, print management unit 13 selects a document that is in the "standby" state and has the smallest number "[n]" in "Document[n]" included in the management information table related to the designated print request. Print management unit 13 designates the selected document as the document to be printed (the designation of the document to be printed; Step S17).

In addition, print management unit 13 determines whether the spooling of the print data of the document to be printed in print data storage unit 12 is completed (Step S18). In the check operation, print management unit 13 determines whether a spool completion signal indicating the completion of the spooling of the print data of the document to be printed is transmitted from first buffering unit 11-1.

As a result of the check, when the spool completion signal is not received (when the spooling is not completed), print management unit 13 waits for the completion of the spooling.

On the other hand, when the spool completion signal has been received (when the spooling has been completed) or when the spool completion signal is received in the standby state (when the spooling is completed thereafter), print management unit 13 extracts the print data of the document to be printed from print data storage unit 12 and transmits the print data and the print request to print processing unit 15 (Step S19). Then, print management unit 13 changes the "state" of the document to be printed from "standby" to "being requested" with reference to the management information table related to the designated print request.

Print processing unit 15 receives the print request and starts the printing process based on the received print data (Step S20). Then, print management unit 13 changes the "state" of the document to be printed from "being requested" to "being printed" with reference to the management information table related to the designated print request.

When the printing process ends, print processing unit 15 transmits a print end signal to print management unit 13 (Step S21).

Print management unit 13 changes the "state" of the document to be printed from "being printed" to "print end" with reference to the management information table related to the designated print request.

In addition, print management unit 13 determines whether there is a document that has not been printed (whether there is a document in the "standby" state) in the management information table (Step S22).

As a result of the check, when there is a document that has not been printed (when there is a document in the "standby" state), the print management unit 13 selects a document that is in the "standby" state and has the smallest number "[n]" in "Document[n]" and designates the selected document as the document that to be printed (Step S17). Then, the image forming apparatus performs Step S18 and the subsequent steps.

On the other hand, when there is no document that has not been printed (when all documents are in the "print end" state), print management unit 13 determines whether there is a print request that has not been printed (Step S23). In the check operation, print management unit 13 determines whether there is a management information table including information indicating the state "standby" among the management information tables registered in table storage unit 14a.

As a result of the check, when there is a management information table including the information indicating the state "standby", image forming apparatus 10a sequentially performs the printing process on the documents in the "standby" state (Steps S16 to S23).

On the other hand, when there is no management information table including the information indicating the state "standby", (information indicates the state "print end" in all of the management information tables registered in table storage unit 14a), image forming apparatus 10a ends the print management method according to the present disclosure.

(2-2) Example

Next, an example of the print management method will be described with reference to FIG. 5.

In this example, it is assumed that at least two information processing apparatuses 20 (20-1 and 20-2) and one image forming apparatus 10a are connected to each other through communication line 30 to form information processing system 1.

Information processing apparatus 20-1 transmits print request A to image forming apparatus 10a.

Figure 5:
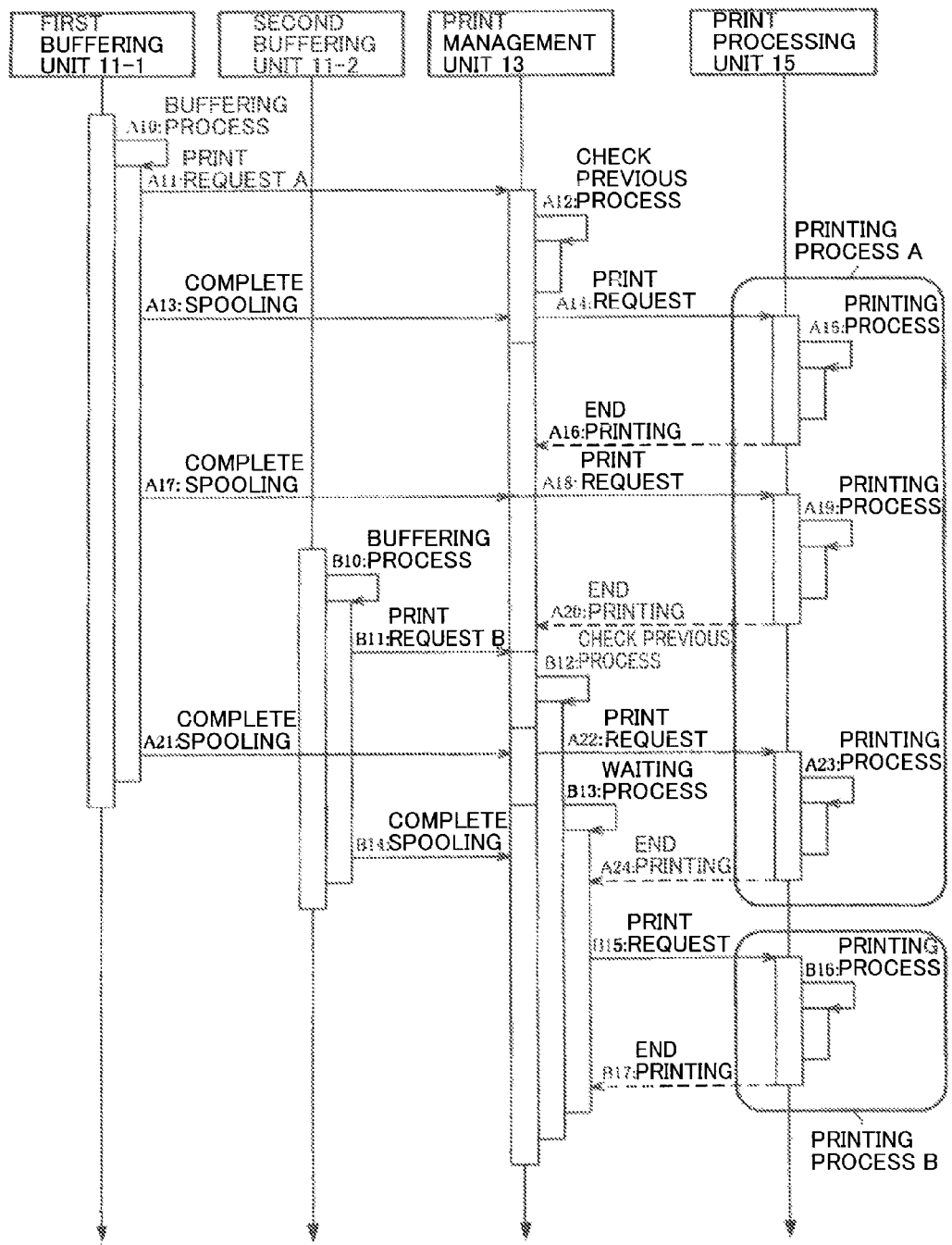
FIG. 5 shows the operation of the image forming apparatus according to the first embodiment of the present disclosure.

When receiving print request A transmitted from information processing apparatus 20-1 (Step S10 in FIG. 4), first buffering unit 11-1 of image forming apparatus 10a transmits and spools print data included in print request A to print data storage unit 12 (Step S11 in FIG. 4 and A10 in FIG. 5 (buffering process)).

First buffering unit 11-1 transmits print request A and information about a document included in print request A to print management unit 13 (A11 in FIG. 5).

When receiving print request A from first buffering unit 11-1, print management unit 13 creates a management information table based on the information about the document (Step S12 in FIG. 4). The created management information table is stored and registered in table storage unit 14a.

In this example, it is assumed that print request A transmitted from information processing apparatus 20-1 is for printing three documents. In addition, it is assumed that print request A includes information about three documents.

Then, print management unit 13 checks the previous process (Step S13 in FIG. 4 and A12 in FIG. 5). As a result of the previous process check, when there is no print request that is currently being printed by print processing unit 15 (No in Step S14 in FIG. 4), print management unit 13 determines whether there is a management information table including information indicating the state "standby" among the management information tables registered in table storage unit 14a.

As a result of the check, since there is the state "standby" only in the currently registered management information table, print management unit 13 designates print request A related to the management information table as the print request to be printed (Step S16 in FIG. 4).

In addition, print management unit 13 selects a document that is in the "standby" state and has the smallest number "[n]" in "Document[n]" included in the currently registered management information table and designates the selected document as the document to be printed (Step S17 in FIG. 4). Here, it is assumed that print management unit 13 designates "Document[0]" as the document to be printed (see FIG. 2).

Print management unit 13 determines whether the spooling of the print data of the document to be printed in print data storage unit 12 is completed (Step S18 in FIG. 4). When a spool completion signal of "Document[0]" that is the document to be printed is transmitted from first buffering unit 11-1 (A13 in FIG. 5), print management unit 13 extracts the print data of "Document[0]" that is the document to be printed from print data storage unit 12 and transmits the print data and the print request to print processing unit 15 (Step S19 in FIG. 4 and A14 in FIG. 5). In addition, the print management unit 13 changes the "state" of "Document[0]" that is the document to be printed from "standby" to "being requested" with reference to the management information table related to designated print request A.

Print processing unit 15 receives the print request and starts a printing process based on the received print data (Step S20 in FIG. 4 and A15 in FIG. 5). Then, print management unit 13 changes the "state" of "Document[0]" that is the document to be printed from "being requested" to "being printed" with reference to the management information table related to designated print request A.

When the printing process ends, print processing unit 15 transmits the print end signal to the print management unit 13 (Step S21 in FIG. 4 and A16 in FIG. 5).

Print management unit 13 changes the "state" of "Document[0]" that is the document to be printed, from "being printed" to "print end" with reference to the management information table related to designated print request A.

In addition, print management unit 13 determines whether there is a document that has not been printed in the management information table related to designated print request A (whether there is a document in the "standby" state) (Step S22 in FIG. 4).

As a result of the check, since "Document[1]" is in the "standby" state, "Document[1]" is designated as the document to be printed (Step S17 in FIG. 4).

The same process as that for "Document[0]" is performed on "Document[1]" (Steps S18 to S21 in FIG. 4 and A17 to A20 in FIG. 5).

However, when print request B is transmitted from information processing apparatus 20-2 to image forming apparatus 10a for the period from the start to the end of the printing process on "Document[1]" by print processing unit 15 (between A19 and A20 in FIG. 5), second buffering unit 11-2 of image forming apparatus 10a receives print request B transmitted from information processing apparatus 20-2 (Step S10 in FIG. 4). Then, second buffering unit 11-2 transmits and spools print data included in print request B to print data storage unit 12 (Step S11 in FIG. 4 and B10 in FIG. 5 (buffering process)). In addition, second buffering unit 11-2 transmits the print request B and information about a document included in print request B to print management unit 13 (B11 in FIG. 5).

When receiving print request B from second buffering unit 11-2, print management unit 13 creates a management information table based on the information about the document (Step S12 in FIG. 4). The created management information table is stored and registered in table storage unit 14a.

In this example, it is assumed that print request B transmitted from information processing apparatus 20-2 is for printing one document and includes information about one document.

Then, print management unit 13 checks the previous process (Step S13 in FIG. 4 and B12 in FIG. 5). As a result of the previous process check, when print processing unit 15 is performing a printing process (A19) on print request A (Yes in Step S14 of FIG. 4), print management unit 13 continuously performs the printing process (A19) (Step S15). In this way, print management unit 13 sets print request B transmitted from second buffering unit 11-2 to a standby state (waiting process; B13 in FIG. 5).

When receiving the print end signal from print processing unit 15 (A20 in FIG. 5), print management unit 13 changes the state of "Document[1]" from "being printed" to "print end" in the management information table related to print request A (Step S21 in FIG. 4) and determines whether there is a document that has not been printed (whether there is a document in the "standby" state) (Step S22 in FIG. 4).

As a result of the check, since "Document[2]" is in the "standby" state, "Document[2]" is designated as the document to be printed (Step S17 in FIG. 4).

The same process as that for "Document[0]" is performed on "Document[2]" (Steps S18 to S21 in FIG. 4 and A21 to A24 in FIG. 5).

When receiving the print end signal from print processing unit 15 (A24 in FIG. 5), print management unit 13 changes the state of "Document[2]" from "being printed" to "print end" in the management information table related to print request A (Step S21 in FIG. 4) and determines whether there is a document that has not been printed (Step S22 in FIG. 4).

As a result of the check, since there is no document is in the "standby" state, print management unit 13 determines whether there is a print request that has not been printed (Step S23 in FIG. 4).

As a result of the check, since the printing process has not been performed on print request B transmitted from information processing apparatus 20-2, print management unit 13 performs the printing process on print request B (Steps S16 to S23 in FIG. 4 and B14 to B17 in FIG. 5).

As described above, according to the image forming apparatus of the first embodiment, the information about the document is modified into a table for each print request and registered in the table storage unit and the printing process is performed for each table. Therefore, it is possible to perform the printing process for each print request. In this way, even when a plurality of documents are requested to be printed in response to one print request, the printing of the documents is not interrupted by another print request and a printing process in response to another print request is not performed while the plurality of documents are being printed.

Therefore, a printout based on one print request is not mixed with a printout based on another print request in the output tray of the image forming apparatus. In this way, according to the image forming apparatus of the first embodiment, it is possible to prevent the user from having the printout of another person by mistake or to avoid the inconvenience of sorting the printout.

Second Embodiment

An image forming apparatus according to a second embodiment of the present disclosure will be described with reference to FIG. 6.

Figure 6:
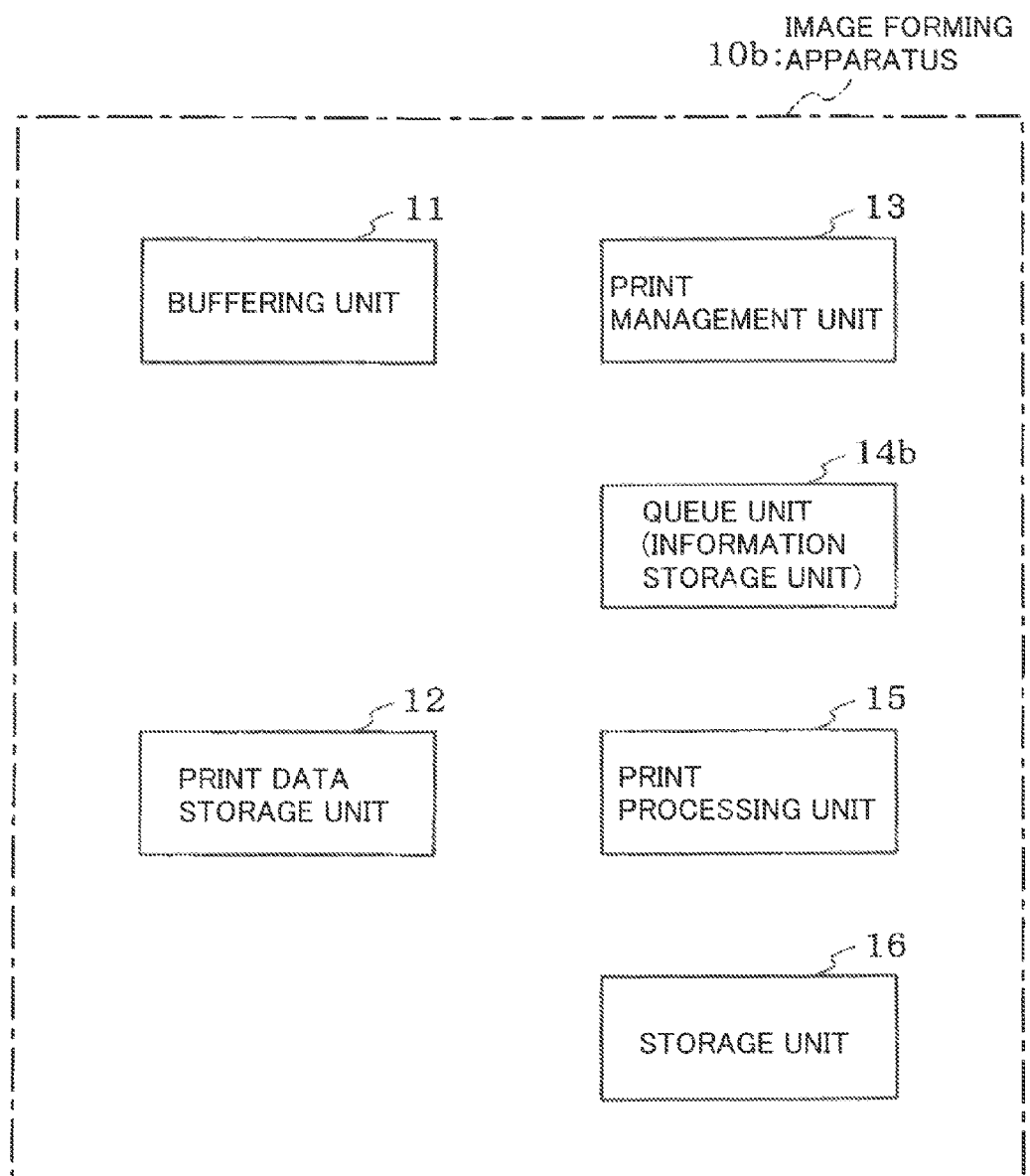
FIG. 6 shows the operation of the image forming apparatus according to the second embodiment of the present disclosure.

FIG. 6 is a block diagram illustrating the structure of the image forming apparatus according to the second embodiment.

The second embodiment is different from the first embodiment in a method of storing information about a document. That is, in the first embodiment, the image forming apparatus stores the information modified into a table about the document and designates the document to be printed with reference to the table. In contrast, in the second embodiment, the image forming apparatus stores the information about the document in a queue and performs a printing process based on the dequeued information. The other structure elements are the same as those in the first embodiment.

Therefore, in FIG. 6, the same components as those in FIG. 1 are denoted by the same reference numerals and the detailed description thereof will not be repeated.

(1) Structure of Image Forming Apparatus

As illustrated in FIG. 6, image forming apparatus 10b includes buffering unit 11, print data storage unit 12, print management unit 13, queue unit 14b, print processing unit 15, and storage unit 16.

When receiving a print request transmitted from information processing apparatus 20, buffering unit 11 transmits and spools print data included in the print request to print data storage unit 12, and enqueues and stores information about a document included in the print request in queue unit 14b.

Queue unit 14b stores the information about the document in a first-in first-out (FIFO) list structure.

In addition, queue unit 14b stores information about the document that is requested to be printed in response to the print request and functions as an "information storage unit".

Print management unit 13 dequeues the information about the document from queue unit 14b and transmits the information to print processing unit 15. In this case, print management unit 13 sequentially dequeues the information items about the documents stored in queue unit 14b in chronological order from oldest to newest.

The other operations of print management unit 13 will be described in detail in "(2) Print management method".

(2) Print Management Method

Next, a print management method that is the operation of the image forming apparatus according to the second embodiment will be described with reference to FIG. 7.

Figure 7:
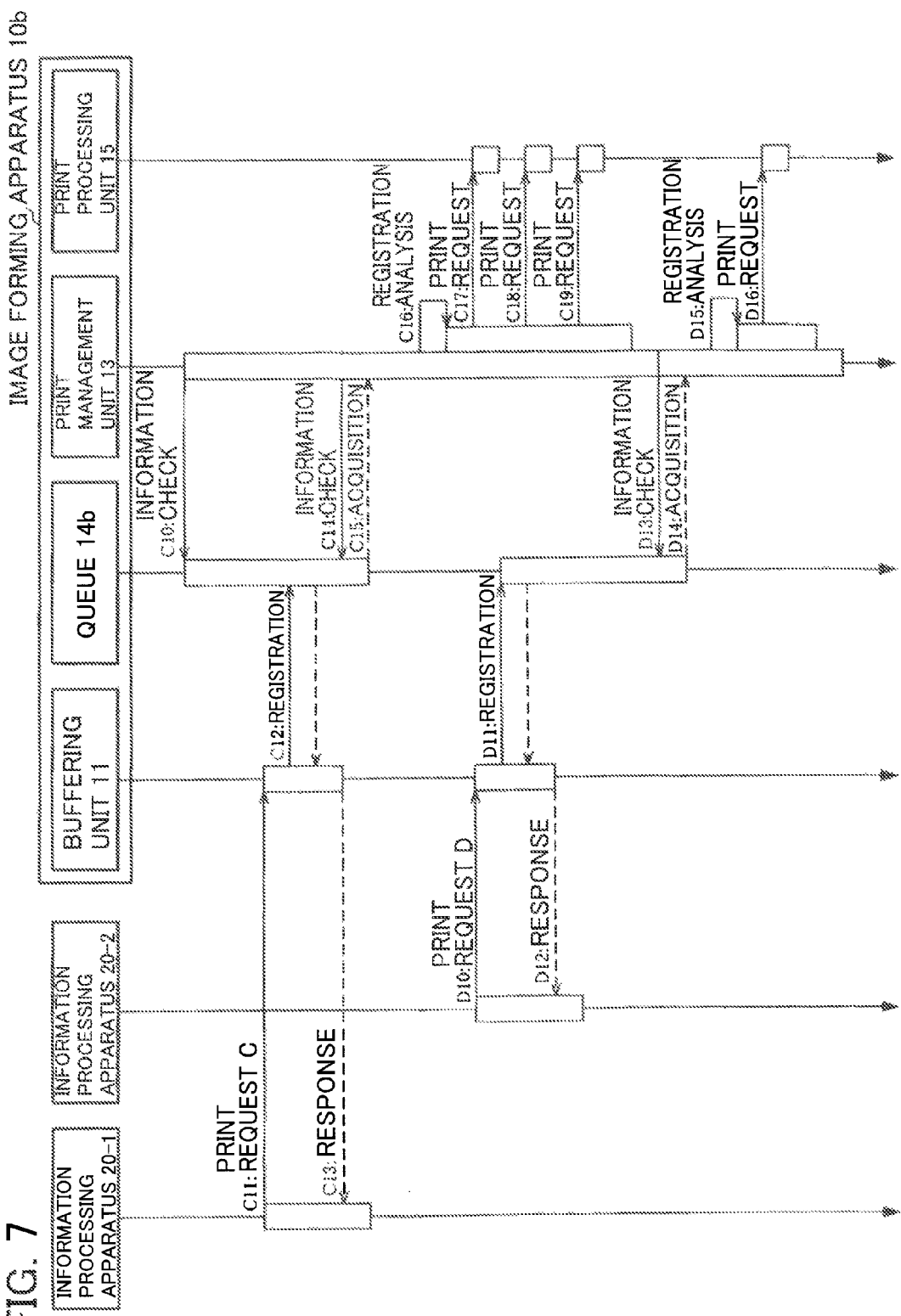
FIG. 7 shows the operation of an information processing apparatus and an image forming apparatus according to a second embodiment of the present disclosure.
Figure 8:
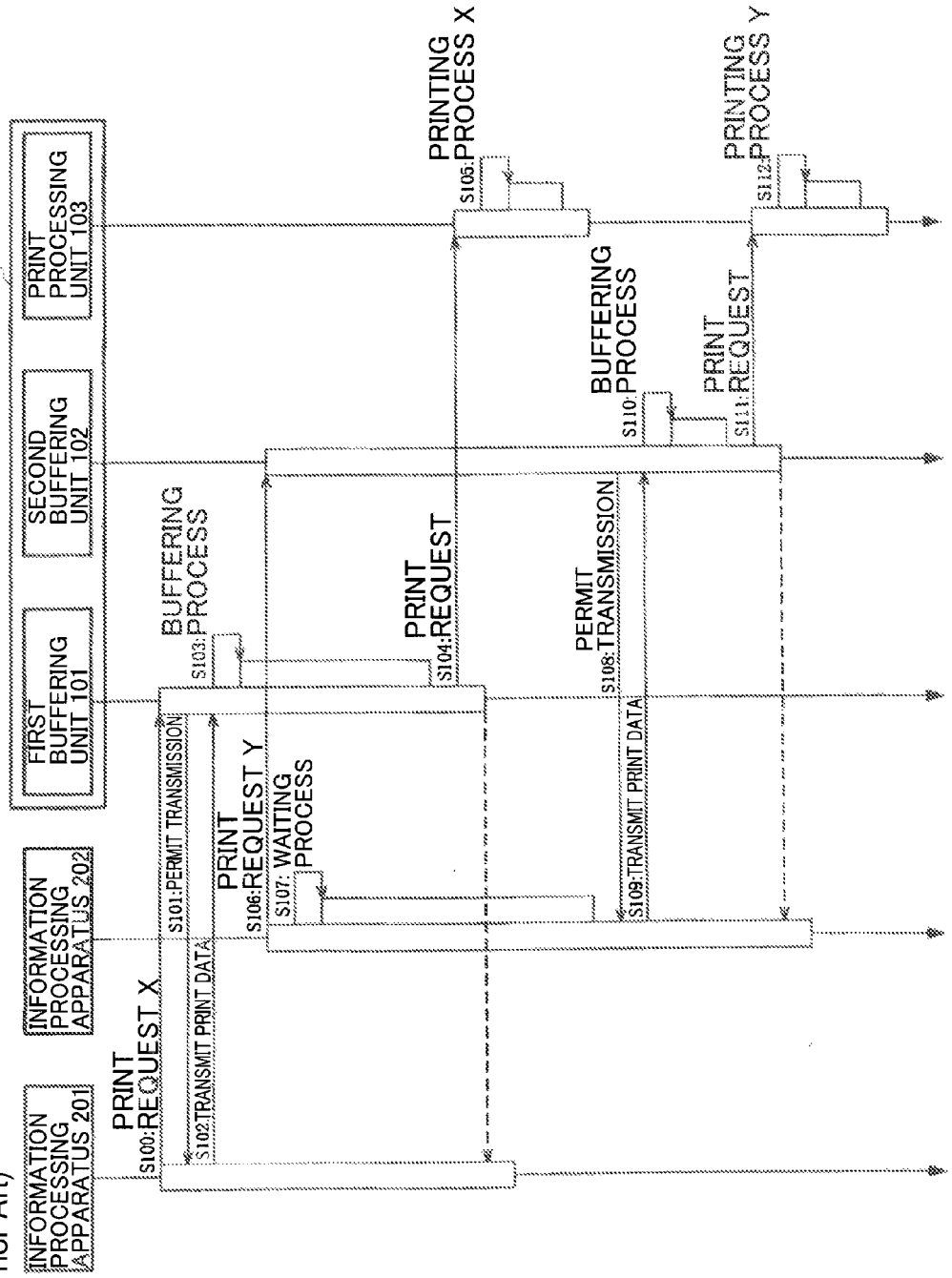
FIG. 8 shows the operation of an information processing apparatus and an image forming apparatus according to the related art.
Figure 9:
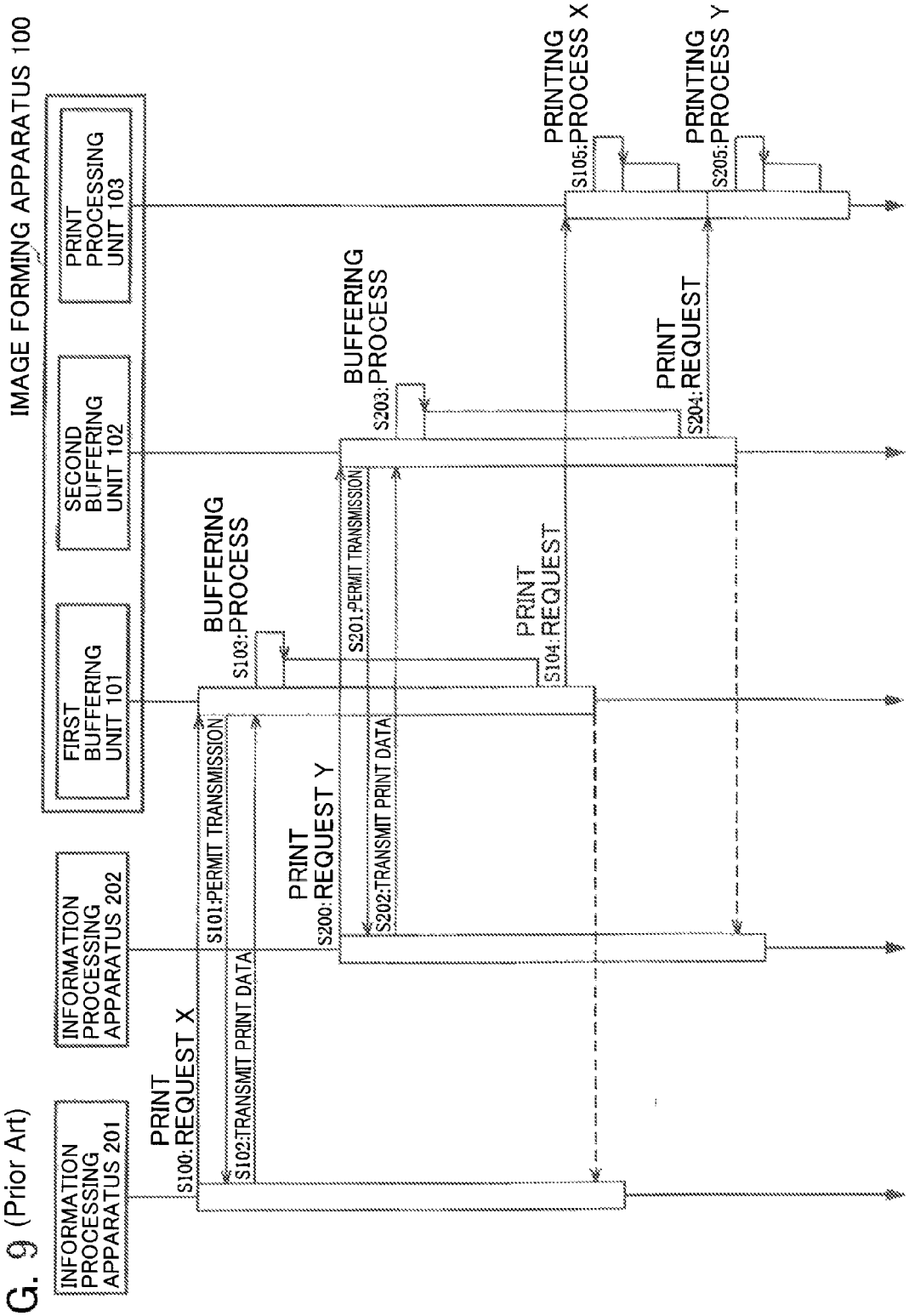
FIG. 9 shows another operation of the information processing apparatus and the image forming apparatus according to the related art.
Figure 10:
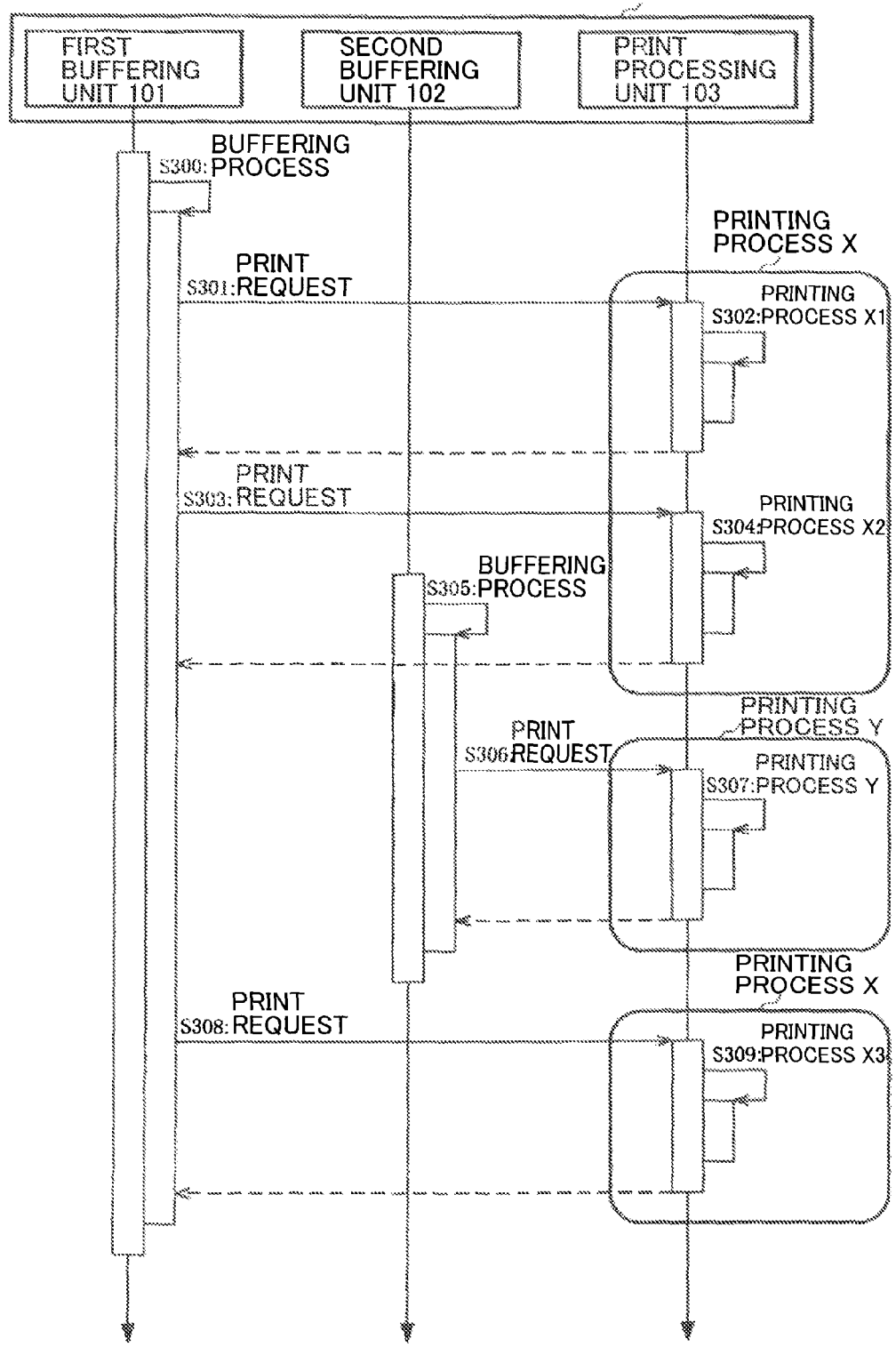
FIG. 10 shows still another operation of the image forming apparatus according to the related art.

FIG. 7 is an operation sequence diagram illustrating the procedure of the print management method according to the second embodiment.

In the description of the operation, it is assumed that two information processing apparatuses 20-1 and 20-2 and one image forming apparatus 10b are connected through communication line 30 to form information processing system 1.

Print management unit 13 of image forming apparatus 10b determines whether the information about the document is registered in queue unit 14b (information check; C10 in FIG. 7). Print management unit 13 performs the information check at a specific time interval.

Information processing apparatus 20-1 transmits print request C to image forming apparatus 10b (C11).

Print request C transmitted from information processing apparatus 20-1 is for printing three documents (doc0011, doc0012, and doc0013). It is assumed that print request C includes information about the three documents.

When receiving print request C transmitted from information processing apparatus 20-1, buffering unit 11 of image forming apparatus 10b transmits and spools print data included in print request C to print data storage unit 12, and enqueues and stores the information about the documents included in print request C in queue unit 14b (the registration of the information about the documents; C12). Buffering unit 11 enqueues and stores the information about the documents in queue unit 14b in the order of "doc0011", "doc0012", and "doc0013".

Buffering unit 11 transmits a response signal to information processing apparatus 20-1 (C13).

Then, when it is checked that the information about the document has been registered in queue unit 14b by the information check (C14), print management unit 13 acquires the information about the documents (C15). Print management unit 13 dequeues and acquires the information about the documents in the order in which the information is enqueued in queue unit 14b. Specifically, print management unit 13 acquires the information in the order of "doc0011", "doc0012", and "doc0013".

Then, the print management unit 13 performs registration analysis (C16). The registration analysis is clarifying the order in which the acquired information about the documents is stored in queue unit 14b (registration order analysis) and fixing the order.

Print management unit 13 directs print processing unit 15 to perform a printing process in the registration order fixed in queue unit 14b. For example, assuming that the fixed registration order is (1) "doc0011", (2) "doc0012", and (3) "doc0013", first, print management unit 13 extracts the print data of "doc0011" from print data storage unit 12 and transmits the print data to print processing unit 15 and directs print processing unit 15 to perform a printing process on "doc0011" (print request; C17). Then, print management unit 13 extracts the print data of "doc0012" from print data storage unit 12 and transmits the print data to print processing unit 15 and directs print processing unit 15 to perform a printing process on "doc0012" (print request; C18). Then, print management unit 13 extracts the print data of "doc0013" from print data storage unit 12 and transmits the print data to print processing unit 15 and directs print processing unit 15 to perform a printing process on "doc0013" (print request; C19).

However, when information processing apparatus 20-2 transmits print request D to image forming apparatus 10b for the period from the start of the printing of "doc0011" to the end of the printing of "doc0013" by print processing unit 15 (D10), buffering unit 11 of image forming apparatus 10b receives print request D transmitted from information processing apparatus 20-2, transmits and spools print data included in print request D to print data storage unit 12, and enqueues and stores information about a document included in print request D in queue unit 14b (the registration of the information about the document; D11).

Print request D transmitted from information processing apparatus 20-2 is for printing one document (doc0021). It is assumed that print request D includes information about the one document.

Buffering unit 11 enqueues and stores information about a document "doc0021" in queue unit 14b.

Then, buffering unit 11 transmits a response signal to information processing apparatus 20-2 (D12).

In this stage, the information about the document (doc0021) included in print request D is stored in queue unit 14b. However, print management unit 13 does not perform an information check process on queue unit 14b until the printing process (C17 to C19) for print request C ends.

When the printing process for print request C ends, print management unit 13 performs an information check process on queue unit 14b (D13). When it is checked that the information about the document is registered in queue unit 14b, print management unit 13 acquires the information about the document (D14). In this case, print management unit 13 dequeues the information about the document in the order in which the information is enqueued in queue unit 14b. Specifically, print management unit 13 acquires "doc0021".

Then, print management unit 13 performs registration analysis (D15). Then, print management unit 13 directs print processing unit 15 to perform a printing process in the fixed registration order.

Since the acquired information about the document is only "doc0021", print management unit 13 extracts the print data of "doc0021" from print data storage unit 12 and transmits the print data to print processing unit 15 and directs print processing unit 15 to perform a printing process on "doc0021" (print request; D16).

As described above, according to the image forming apparatus of the second embodiment, since information about documents is stored in the queue in the order in which the print requests are received, the documents are printed in the storage order. Therefore it enables to perform the printing process for each print request. In this way, even when a plurality of documents are requested to be printed in response to one print request, the printing of the documents is not interrupted by another print request and a printing process in response to another print request is not performed while the plurality of documents are being printed.

Therefore, a printout based on a print request from one image forming apparatus is not mixed with a printout based on a print request from another image forming apparatus in the output tray of the image forming apparatus. In this way, according to the image forming apparatus of the second embodiment, it is possible to prevent the user from having the printout of another person by mistake or avoid the inconvenience of sorting the printouts.

Image Forming Program

Next, an image forming program will be described.

The image forming function (function for performing the image forming method) of the computer (the image forming apparatus or the information processing apparatus) in each of the above-described embodiments is implemented by the image forming program stored in a storage unit (for example, a ROM or a hard disk).

The image forming program is read to a control unit (for example, a central processing unit (CPU)) of the computer and directs the control unit to transmit commands to each component of the computer to perform specific processes, for example, the receiving process of the buffering unit, the spooling process of the print data storage unit, a process of storing information about documents in the queue, the print management process of the print management unit, and the printing process of the print processing unit in the image forming apparatus.

In this way, the image forming function is implemented by the cooperation between the image forming program that is software and each component of the computer (the image forming apparatus or the information processing apparatus) that is hardware resources.

The image forming program for implementing the image forming function may be stored in computer-readable recording media, such as an external memory device and a portable recording medium, in addition to the ROM and the hard disk of the computer.

The external memory device means a memory expansion device in which a recording medium is provided, such as a compact disk-read only memory (CD-ROM), and is externally connected to the image forming apparatus. The portable recording medium means memory that can be provided in a recording medium driving device (drive device) and is, for example, a flexible disk, a memory card, or a magneto-optical disk.

The program recorded on the recording medium is loaded to, for example, the RAM of the computer and is executed by the CPU (control unit). When the program is executed, the functions of the image forming apparatus according to each of the above-described embodiments are implemented.

When the image forming program is loaded to the computer, the image forming program in another computer may be downloaded to the RAM in the computer or the external memory device of the computer through the communication line. The downloaded image forming program is also executed by the CPU to implement the image forming function of the image forming apparatus according to each of the above-described embodiments.

The embodiments of the present disclosure have been described above, but the present disclosure is not limited to the above-described embodiments. Various modifications and changes can be made within the scope of the present disclosure.

For example, in the above-described embodiments, the previous print request is for printing a plurality of documents and the subsequent print request is for printing one document. However, the present disclosure is not limited thereto. The subsequent print request may be for printing a plurality of documents. In this case, according to the present disclosure, the same effect as described above can be obtained.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An image forming apparatus that is connected to a plurality of information processing apparatuses so as to communicate therewith, comprising:
   a buffering unit configured to receive print requests transmitted from the information processing apparatuses;
   an information storage unit configured to store information about documents that are requested to be printed in response to the print requests in an order in which the print requests are received by the buffering unit;
   a print processing unit configured to perform a printing process; and
   a print management unit, based on the print requests, configured to designate the documents to be in an order in which the information about the documents is stored in the information storage unit and to direct the print processing unit to print the designated documents,
   wherein when one print request includes information about a printing process applied to a plurality of documents,
   the print management unit designates the plurality of documents corresponding to the one print request to be in an order in the information storage unit and causes the print processing unit to perform the printing process for the designated plurality of documents until the print processing unit has finished the printing process applied to a last designated document, and
   the print processing unit performs the printing process in the order designated by the print management unit, and
   wherein when another print request is received by the buffering unit while the one print request is in progress in the print processing unit, the print management unit designates a document corresponding to the another print request after the print processing unit finishes the printing process applied to the last designated document corresponding to the one print request.

2. The image forming apparatus according to claim 1, wherein, when the buffering unit receives the print requests,
   the print management unit is configured to create a table of the information about the documents that are requested to be printed in response to the print requests for each print request and to store the table in the information storage unit, and
   the print management unit is configured to designate the documents to be in an order in which the table is stored in the information storage unit and to direct the print processing unit to print the designated documents.

3. The image forming apparatus according to claim 2, wherein the table includes information indicating the order in which the table is stored in the information storage unit, and
   the print management unit is configured to designate the documents based on the information that is included in the table and to indicate the storage order and directs the print processing unit to print the designated documents.

4. The image forming apparatus according to claim 2, wherein, when printing of all documents indicated by document information in a specific table ends, the print management unit is configured to direct the print processing unit to print documents indicated by document information in the table of the print request that is subsequently stored in the information storage unit.

5. The image forming apparatus according to claim 1, wherein the information storage unit is a queue unit,
   the queue unit is configured to enqueue the information about the documents in the order in which the print requests are transmitted, and
   the print management unit is configured to designate the documents in an order in which the information about the documents are enqueued in the queue unit and to direct the print processing unit to print the designated documents.

6. The image forming apparatus according to claim 1, wherein, while the print processing unit performs the printing process based on the print request transmitted from one information processing apparatus, if the buffering unit receives a new print request from another information processing apparatus, the information storage unit is configured to store information about a document that is requested to be printed in response to the new print request, the print management unit is configured to direct the print processing unit to print the document specified by the information about the document stored in the information storage unit, and after printing of the document specified by the information about the document stored in the information storage unit ends, the print management unit is configured to direct the print processing unit to perform the printing process based on the new print request.

7. The image forming apparatus according to claim 1, wherein the print request is configured to designate and print at least one of documents.

8. A method of forming an image in an image forming apparatus that is connected to a plurality of information processing apparatuses so as to communicate therewith, the method comprising:

receiving, via a buffering unit, print requests transmitted from the information processing apparatuses;

storing, via an information storage unit, information about documents that are requested to be printed in response to the print requests in an order in which the print requests are received by the buffering unit;

performing, via a print processing unit, a printing process; and designating, via the print management unit, based on the print requests the documents to be in an order in which the information about the documents is stored in the information storage unit and directing, via the print management unit, the print processing unit to print the designated documents, wherein when one print request includes information about a printing process applied to a plurality of documents, designating, via the print management unit, the plurality of documents corresponding to the one print request to be in an order in the information storage unit and causing the print processing unit to perform the printing process for the designated plurality of documents until finishing, via the print processing unit, the printing process applied to a last designated document, and performing, via the print processing unit, the printing process in the order designated in the designating, and wherein when another print request is received by the buffering unit while the one print request is in progress in the print processing unit, designating, via the print management unit, a document corresponding to the another print request after finishing, via the print processing unit, the printing process applied to the last designated document corresponding to the one print request.

9. A non-transitory computer-readable recording medium that stores an image forming program executed by a computer of an image forming apparatus, the recording medium includes instructions causing the computer to implement a method comprising:

receiving, via a buffering unit, print requests transmitted from the information processing apparatuses;

storing, via an information storage unit, information about documents that are requested to be printed in response to the print requests in an order in which the print requests are received by the buffering unit;

performing, via a print processing unit, a printing process; and designating, via the print management unit, based on the print requests the documents to be in an order in which the information about the documents is stored in the information storage unit and directing, via the print management unit, the print processing unit to print the designated documents, wherein when one print request includes information about a printing process applied to a plurality of documents, designating, via the print management unit, the plurality of documents corresponding to the one print request to be in an order in the information storage unit and causing the print processing unit to perform the printing process for the designated plurality of documents until finishing, via the print processing unit, the printing process applied to a last designated document, and performing, via the print processing unit, the printing process in the order designated in the designating, and wherein when another print request is received by the buffering unit while the one print request is in progress in the print processing unit, designating, via the print management unit, a document corresponding to the another print request after finishing, via the print processing unit, the printing process applied to the last designated document corresponding to the one print request.

* * * * *